US011783609B1

(12) United States Patent
Agarwal et al.

(10) Patent No.: US 11,783,609 B1
(45) Date of Patent: Oct. 10, 2023

(54) SCALABLE WEAK-SUPERVISED LEARNING WITH DOMAIN CONSTRAINTS

(71) Applicant: Intuit Inc., Mountain View, CA (US)

(72) Inventors: Sudhir Agarwal, Palo Alto, CA (US); Anu Sreepathy, Sunnyvale, CA (US); Lalla Mouatadid, Toronto (CA)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/072,453

(22) Filed: Nov. 30, 2022

(51) Int. Cl.
*G06V 30/19* (2022.01)
*G06V 10/70* (2022.01)
*G06V 30/148* (2022.01)

(52) U.S. Cl.
CPC ........ *G06V 30/19147* (2022.01); *G06V 10/70* (2022.01); *G06V 30/15* (2022.01)

(58) Field of Classification Search
CPC ... G06V 30/19147; G06V 10/70; G06V 30/15
See application file for complete search history.

(56) References Cited

U.S. PATENT DOCUMENTS

| | | | | |
|---|---|---|---|---|
| 9,443,314 | B1 * | 9/2016 | Huang | G06V 20/35 |
| 9,679,226 | B1 * | 6/2017 | Huang | G06V 20/35 |
| 10,540,572 | B1 * | 1/2020 | Kim | G06T 5/50 |
| 2015/0310309 | A1 * | 10/2015 | Gopalan | G06F 18/22 |
| | | | | 382/199 |
| 2020/0285889 | A1 * | 9/2020 | Abdi Taghi Abad .. | G06Q 40/04 |
| 2020/0334856 | A1 * | 10/2020 | Staudinger | G06V 10/776 |

* cited by examiner

*Primary Examiner* — Pinalben Patel
(74) *Attorney, Agent, or Firm* — Paradice & Li LLP

(57) ABSTRACT

Systems and methods for training machine learning models based on domain constraints are disclosed. An example method includes receiving a plurality of images, each image associated with a cluster of a plurality of clusters, the plurality of clusters representing an output of a second machine learning model, assigning a label to each cluster of the plurality of clusters based at least in part on a plurality of constraints, identifying, based at least in part on the plurality of constraints, a first label mismatch for a first image, the first label mismatch indicating that the first image belongs to a first cluster but should be assigned to a second cluster different from the first cluster, reassigning the first image to the second cluster, and training the first machine learning model, based on the labeled clusters of the plurality of clusters, to predict labels associated with subsequently received image data.

18 Claims, 6 Drawing Sheets

600

Receive a plurality of sets of images, each set of images including an ordered plurality of images representing an ordered plurality of digits, wherein each set of images has a common width indicating a number of digits in an addend and a common height indicating a number of addends associated with each set of images in the plurality of sets of images, and each set of images is associated with a sum indicates a sum of its constituent addends. (602)

Using a second trained machine learning model, assigning each image in the plurality of sets of images to a respective cluster of a plurality of ten clusters. (604)

Assign a digit to each cluster of the plurality of clusters based at least in part on the sums associated with the sets of images, the assigned digit indicating that each image in a cluster is an image of the corresponding digit. (606)

Identify, based at least in part on the sums, a first digit mismatch for a first image, the first digit mismatch indicating that the first image should be assigned to a first cluster assigned a first digit but was instead assigned to a second cluster assigned a second digit different from the first digit. (608)

Reassign the first image from the second cluster to the first cluster. (610)

Train the machine learning model, based on the labeled clusters of the plurality of clusters, to predict digits associated with subsequently received image data. (612)

*Figure 6*

SCALABLE WEAK-SUPERVISED LEARNING WITH DOMAIN CONSTRAINTS

TECHNICAL FIELD

This disclosure relates generally to methods for training machine learning models, and more specifically to the training of machine learning models to predict text, numbers, or symbols associated with images.

DESCRIPTION OF RELATED ART

Machine learning techniques are frequently used for document extraction, that is, determining the content, such as strings of alphanumeric content, of an input document image. An image of a document may contain numbers or symbols which should be identified and labeled during extraction, such as identifying that a portion of an image represents a specific digit. Training models for use with such techniques may include the use of training data associated with one or more constraints, such as logical or arithmetic constraints.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for clustering and labeling images. An example method may be performed by an electronic device coupled to a first machine learning model and include receiving a plurality of images, each image in the plurality of images associated with a cluster of a plurality of clusters, the plurality of clusters representing an output of a second machine learning model, assigning a label to each cluster of the plurality of clusters based at least in part on a plurality of constraints, identifying, based at least in part on the plurality of constraints, a first label mismatch for a first image, the first label mismatch indicating that the first image belongs to a first cluster but should be assigned to a second cluster different from the first cluster, reassigning the first image to the second cluster, and training the first machine learning model, based on the labeled clusters of the plurality of clusters, to predict labels associated with subsequently received image data.

In some aspects, receiving the plurality of images further includes receiving a plurality of sets of images, where each set of images includes an ordered plurality of images representing an ordered plurality of digits, wherein each constraint of the plurality of constraints represents a sum associated with a respective set of images, and using the second trained machine learning model, assigning each image of the plurality of sets of images to a respective cluster of the plurality of clusters.

In some aspects, the predetermined number of clusters is 10, and the labels assigned to each cluster of the plurality of clusters indicate a digit between 0 and 9.

In some aspects, each set of images in the plurality of sets of images has a common width indicating a number of digits in an addend and a common height indicating a number of addends associated with each set of images, where the sum indicates a sum of addends in each respective set of images.

In some aspects, the label is assigned to each cluster of the plurality of clusters using an accuracy metric based at least in part on the plurality of constraints. In some aspects, assigning the label to each cluster of the plurality of clusters includes solving a convex optimization problem based at least in part on the accuracy metric. In some aspects, computing the accuracy metric for each prospective assignment includes determining a plurality of batches of sets of images, each batch of sets of images including a predetermined number of images from the plurality of images and corresponding to a predetermined number of constraints of the plurality of constraints, for each batch of the plurality of batches, selecting a batch-specific prospective assignment associated with a greatest accuracy metric, and selecting the most accurate prospective assignment based at least in part on the selected batch-specific prospective assignments. In some aspects, the accuracy metric is based on an L1 norm indicating how closely a prospective assignment satisfies the sum associated with each set of images.

In some aspects, identifying the first label mismatch includes identifying a centroid for each cluster, adding images within a specified radius of the centroid for each cluster to a group of resolved images, and identifying the first image based on the plurality of constraints and the group of resolved images. In some aspects, identifying the first image includes identifying a set of images including the first image and a first subset of the group of resolved images, determining, based on a first sum associated with the first set of images and a first digit corresponding to the first cluster, that the first image does not correspond to the first digit, and identifying the second cluster as the cluster corresponding to a second digit which, together with the first subset, satisfy the sum corresponding to the first set of images. In some aspects, method further includes iteratively increasing the specified radius and identifying, based on the plurality of constraints, one or more second label mismatches for one or more second images, each second label mismatch indicating that the one or more second images should be assigned to a different cluster. In some aspects, iteratively increasing the specified radius includes iteratively increasing the specified radius until a threshold radius is reached.

In some aspects, the second machine learning model includes a symmetric autoencoder configured to cluster the images based at least in part on a k-means clustering algorithm.

Another innovative aspect of the subject matter described in this disclosure can be implemented in a system for clustering and labeling images. An example system may be associated with a first machine learning model and include or more processors, and a memory storing instructions for execution by the one or more processors. Execution of the instructions causes the system to perform operations including receiving a plurality of images, each image in the plurality of images associated with a cluster of a plurality of clusters, the plurality of clusters representing an output of a second machine learning model configured to cluster images into a predetermined number of clusters, assigning a label to each cluster of the plurality of clusters based at least in part on a plurality of constraints associated with the plurality of images, identifying, based at least in part on the plurality of constraints, a first label mismatch for a first image, the first label mismatch indicating that the first image belongs to a first cluster but should be assigned to a second cluster different from the first cluster, reassigning the first image from the first cluster to the second cluster, and training the first machine learning model, based on the labeled clusters of the plurality of clusters, to predict labels associated with subsequently received image data.

Another innovative aspect of the subject matter described in this disclosure can be implemented in a method for clustering and labeling images. An example method is performed by an electronic device coupled to a first machine learning model and includes receiving a plurality of sets of images, each set of images including an ordered plurality of images representing an ordered plurality of digits, wherein each set of images has a common width indicating a number of digits in an addend and a common height indicating a number of addends associated with each set of images in the plurality of sets of images, and each set of images is associated with a sum indicates a sum of its constituent addends, using a second trained machine learning model, assigning each image in the plurality of sets of images to a respective cluster of a plurality of ten clusters, assigning a digit to each cluster of the plurality of clusters based at least in part on the sums associated with the sets of images, the assigned digit indicating that each image in a cluster is an image of the corresponding digit, identifying, based at least in part on the sums, a first digit mismatch for a first image, the first digit mismatch indicating that the first image should be assigned to a first cluster assigned a first digit but was instead assigned to a second cluster assigned a second digit different from the first digit, reassigning the first image from the second cluster to the first cluster, and training the first machine learning model, based on the labeled clusters of the plurality of clusters, to predict digits associated with input image data.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows an illustrative flow chart depicting an example operation for clustering and labeling images, according to some implementations.

Like numbers reference like elements throughout the drawings and specification.

DETAILED DESCRIPTION

Figure 1:
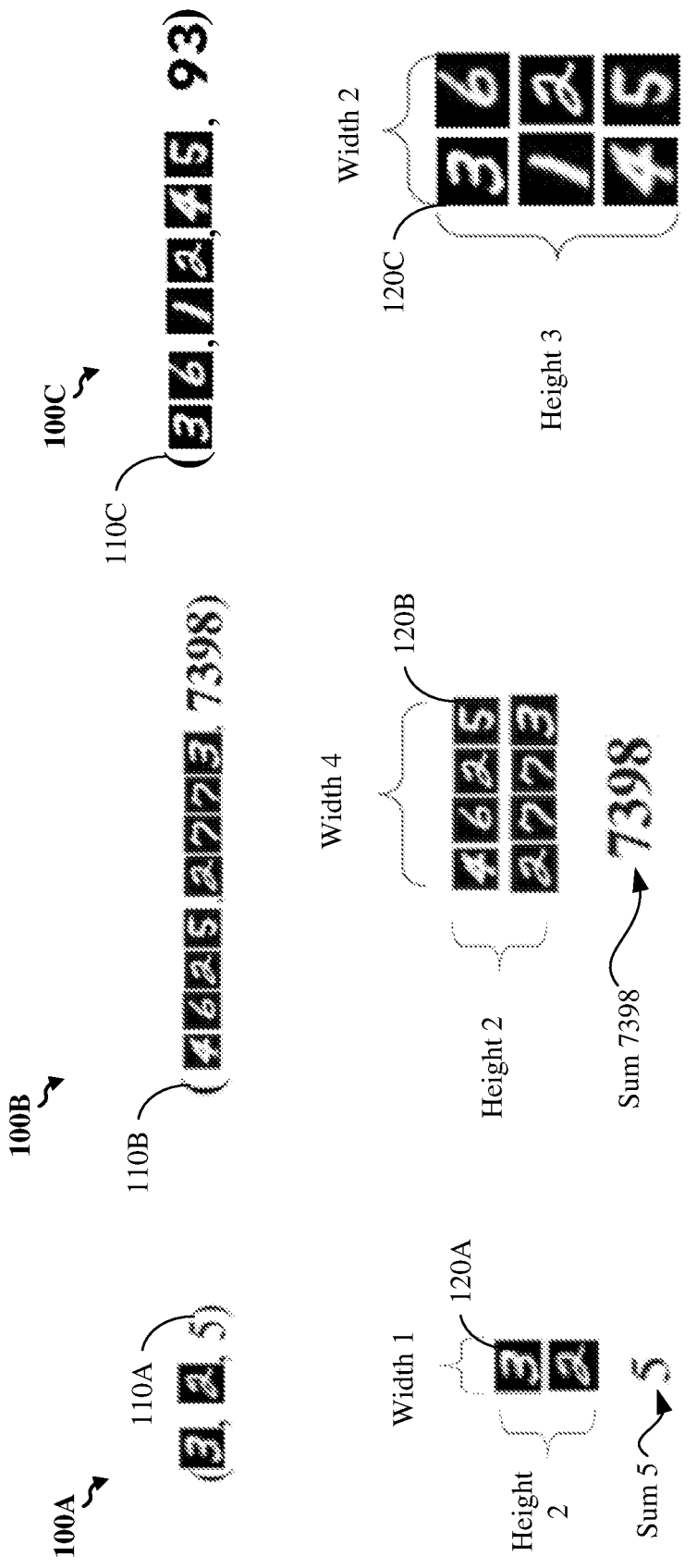
FIG. 1A shows a first set of images which may be used with the example implementations.
FIG. 1B shows a second set of images which may be used with the example implementations.
FIG. 1C shows a third set of images which may be used with the example implementations.

It is desirable to integrate logical reasoning into machine learning techniques, in order to generate machine learning models which not only accurately label input data, but which generate predictions which comply with domain constraints. For example, machine learning techniques may be used to apply labels to images from a document, such as numeric or symbolic labels. In this context, some domain constraints may be arithmetic, and incorporate knowledge about sums, differences, products, and so on in order to improve the accuracy of numeric label predictions. For example, a document may contain handwritten characters to be identified based on images captured of the characters, but where one or more constraints on the handwritten characters are known, such as a sum, difference, or another constraint associated with the handwritten characters. Alternatively, the domain constraints may be more symbolic, for example being based on the rules of a game, such as sudoku, where knowledge of the contents of other cells in a row, column, and so on may constrain the contents of a given cell. However, integration of such constraints is a significant challenge, and may present significant problems of scalability and accuracy.

For example, many conventional techniques do not scale well due to model grounding. Model grounding refers to the computation of all label assignments for the constrained variables and may lead to undesirable or impractically drastic increases in model training time, particularly for more complex constraints. This is referred to as the grounding bottleneck, and the drastic increases in model training time referred to as a combinatorial blowup, or a combinatorial explosion. Such problems significantly limits the use of conventional techniques.

Implementations of the subject matter described in this disclosure may be used to cluster and label images based on a plurality of constraints, and to train a machine learning model to label input images based on the clustered and labeled images. Training data for the machine learning model may be generated based on a plurality of sets of images, where each set of images has specified dimensions and is each subject to a constraint. For example, each set of images may correspond to an arithmetic problem, where each image corresponds to a digit, such as a handwritten digit. The constraint may indicate an arithmetic quantity associated with the set of images, such as a sum, a difference, a product, and so on. In some aspects, the type of constraint may be indicated by one or more images in the sets of images, such as an image of an addition, subtraction, or multiplication sign, or similar. The dimensions in this case may indicate a width and a height associated with the arithmetic quantity, such as a number of digits in each addend and a number of addends, respectively, when the arithmetic quantity is a sum. In some aspects, the dimensions may be the same for all sets of images in the training data, while in some other aspects, the dimensions may differ. The constraints may alternatively be symbolic or logical. The images of these sets of images may be clustered, for example using an autoencoder configured to cluster the images of the plurality of sets of images into ten clusters, each indicating that all images in a cluster represent the same digit or symbol. More generally, the images may be clustered into n clusters, where n may be greater than ten, for example when one or more of the images represent addition or subtractions signs. Labels may be predicted for these clusters, based on the dimensions and the constraints associated with each set of images. The accuracy of these predicted labels may then be improved using an iterative process based on the constraints. These, and other aspects of the example implementations are discussed further below.

Various implementations of the subject matter disclosed herein provide one or more solutions to the technical problem of training a machine learning model to classify images based on associated constraints when no labels are present for images in the training data, such as predicting handwritten symbols or digits is represented in an input image. As discussed above, conventional techniques do not scale well due to the grounding bottleneck and resulting combinatorial explosion. In contrast, the present implementations may avoid this grounding bottleneck through the use of an initial clustering stage and by exploiting knowledge of and the universality of the constraints among the training examples to predict and correct image labels without calculating all possible label assignments for each image. The avoidance of the grounding bottleneck allows example machine learning models to be trained significantly faster, to be trained and used for more complex constraints, and to improve prediction accuracy. More specifically, various aspects of the present disclosure provide a unique computing solution to a unique computing problem that did not exist prior to the use of machine learning models for identifying handwritten text subject to known constraints. As such, implementations of the subject matter disclosed herein are not an abstract idea such as organizing human activity or a mental process that can be performed in the human mind—indeed, the human mind is not capable of training a machine learning model, much less of training a machine learning model to predict labels for input images based on domain knowledge of a document or field where the input images are located.

Moreover, various aspects of the present disclosure effect an improvement in the technical field of machine learning prediction by more efficiently training a machine learning model to predict labels associated with input images as compared to conventional techniques. Indeed, the example techniques allow for significantly reduced training times and for models to be trained for more complex problems and constraints. Training the machine learning model using such techniques cannot be performed in the human mind, much less using pen and paper.

As discussed above, the example implementations may be used to train a machine learning model to identify images representing characters or symbols in a document which are subject to known constraints. Training data may be generated based on such characters and constraints. For example, the training data may be generated based on a plurality of sets of images, where each set of images has specific dimensions, and is each subject to a constraint. In some implementations, the specific dimensions are constant for all sets of images in the training data, while in some other implementations the specific dimensions may differ for sets of images in the training data. In some aspects, each set of images may correspond to an arithmetic problem, where each image corresponds to a digit, such as a handwritten digit. The constraint may indicate an arithmetic quantity associated with the set of images, such as a sum, a difference, a product, and so on. More generally, the type of constraint may be indicated by one or more images in the sets of images, such as one or more images of an addition sign, subtraction sign, multiplication sign, and so on. In some aspects, this training data may include images from a known database, such as the Modified National Institute of Standards and Technology (MNIST) database. The MNIST database is a large database of handwritten digits which is commonly used for training image processing systems. More particularly, images from the MNIST database (or a similar database) may be grouped into the sets of images and associated with a constraint based on the digits represented in the images of a set, as discussed in more detail below.

In some aspects, the example implementations may be used for extracting handwritten information from forms. In some cases, the context of the form provides information which may be leveraged for improving recognition of the handwritten information. For example, a sum of the handwritten information or another arithmetic constraint on the handwritten information may be known. For example the sum may be present in a typed field of the form or may be known from the context of the form. Such forms may be financial forms, such as loan or tax related forms. In some other implementations, the handwritten information may represent a logical or mathematical game such as sudoku, where a user has provided handwritten information in empty cells of the game, while typewritten information is present in other cells. In these other implementations, the constraint may either be typewritten on the form, or may be indicated contextually.

FIG. 1A shows a first set of images 100A which may be used with the example implementations. FIG. 1A shows an example set of images including two images and a sum associated with the two images. Such images may be taken, for example, from a known database such as the MNIST database. For example, the first set of images 100A may be represented as an array 110A including the first image of the array (a handwritten 3), the second image of the array (a handwritten 2), and a sum 5 associated with the two images. Each image depicts a digit, and this digit is the "label" which should be assigned to each image. For example, the label for image 1 should be the digit 3, or label(image 1)=3. This array 110A may represent an arithmetic problem 120A having a specific width of 1 indicating that each addend in the problem has one digit and thus includes one image, and a height of 2 indicating that the arithmetic problem 120A includes two addends. Thus, in the absence of knowledge as to which digit each image represents, the arithmetic problem 120A provides the constraint that label(image 1)+label(image 2)=5.

FIG. 1B shows a second set of images 100B which may be used with the example implementations. FIG. 1B shows an example set of images including eight images and a sum associated with the eight images. For example, the second set of images 100B may be represented as an array 110B including the first four images of the set as its first element (images 1-4 respectively representing 4, 6, 2, and 5), the second four images of the set as its second element (images 5-8 respectively representing 2, 7, 7, and 3), and a sum 7398 associated with the eight images. This array 110B may represent an arithmetic problem 120B having a width of four indicating that each addend in the problem has four digits, and is therefore represented by four images, and a height of two indicating that the arithmetic problem 120B includes two addends. Thus, in the absence of knowledge as to which digit each image represents, the arithmetic problem 120B provides the constraint that {1000*label(image 1)+100*label(image 2)+10*label(image 3)+label(image 4)}+{1000*label(image 5)+100*label(image 6)+10*label(image 7)+label(image 8)}=7398.

FIG. 1C shows a third set of images 100C which may be used with the example implementations. FIG. 1C shows an example set of images including six images and a sum associated with the six images. For example, the third set of images 100C may be represented as an array 110C including the first two images of the set as its first element (images 1-2 respectively representing 3 and 6), the second two images of the set as its second element (images 3-4 respectively representing 1 and 2), the third two images of the set as its third element (images 5-6 respectively representing 4 and 5), and a sum 93 associated with the six images. This array 110C represents an arithmetic problem 120C having a width of two and a height of three. Thus, in the absence of knowledge as to which digit each image represents, the arithmetic problem 120C provides the constraint that 10*label(image 1)+label(image 2)+10*label(image 3)+label(image 4)+10*label(image 5)+label(image 6)=93.

Note that while the sets of images described for FIGS. 1A-1C are each associated with a sum constraint, that in some other implementations, the constraints may instead be other logical or arithmetic constraints, such as differences, products, and so on. Similarly, the constraints may be implied, such that the value of the constraint is not included in the set of images. For example, consider a set of images representing a field of cells associated with a game of sudoku. The sum of each row and column is known and constant.

Further, while the type of constraint within the sets of images shown in FIGS. 1A-1C is a sum constraint and is implied rather than expressly stated within the sets of images, in some other implementations, each set of images may indicate the type of constraint. For example, one or more images in a set of images may be an image of an addition sign indicating that the constraint is a sum constraint, a subtraction sign indicating that the constraint is a difference constraint, a multiplication sign indicating that the constraint is a product constraint, and so on. In some aspects, each row of images other than the first row may indicate such a constraint type. For example, such a row may begin with an addition sign indicating that the number represented in that row should be added to yield the value of the constraint, or a subtraction sign indicating that the number represented in that row should be subtracted to yield the value of the constraint. In some aspects, different operation signs may be provided within a set of images, for example indicating that some rows should be added, and some subtracted to yield the value of the constraint. In some aspects, the constraints may include addition/subtraction as well as multiplication/division, and mathematical order of operations may indicate the order in which the operations are to be performed to yield the value of the constraint, such as performing multiplication and division prior to addition or subtraction. More generally, the sets of images may include grouping operators, such as parentheses, brackets, and so on, specifying the order of operations when different from the standard order of operations.

The example implementations may receive a plurality of such sets of images as input for generating training data. Each set of images in the plurality of sets of images may have specified dimensions. In some aspects each set of images in the plurality of sets of images may have a common width and a common height, while in some other aspects the specified dimensions may differ across the plurality of sets of images. In some aspects, while the value of the constraint varies for each set of images, the type of constraint may remain the same among all sets of images of the plurality of sets of images (i.e., each constraint may be computed the same way from the image labels or the images in the set). This type of constraint may be implied or express. In some implementations, the type of constraint may differ for different sets of images, for example each set of images may indicate the type of constraint. As discussed above, in some aspects, one or more images in each set of images may indicate the type of constraint associated with that set of images, such as one or more images indicating mathematical operators or grouping operators.

As an initial step, the images of the plurality of sets of images may be clustered into a plurality of clusters. For example, when the images are images of digits, as in FIGS. 1A-1C, there may be ten clusters, such that the clustering is configured to cluster images representing the same digit. In some other implementations there may be other number of clusters, such as when images in the sets of images include images of mathematical or grouping operators. For example, when constraints may include addition, subtraction, multiplication, and division operators, there may be fourteen clusters rather than ten. The clustering is performed by a trained machine learning model, such as an autoencoder. In some aspects, the autoencoder may be a fully connected symmetric autoencoder with dense layer dimensions [500, 500,2000,10], where the dimensions refer to the number of nodes in each layer of the encoder. In some aspects, the autoencoder may be trained for 300 epochs. The clusters may be generated based on the weights of the autoencoder using a suitable technique such as k-means with k-means++ initiation.

After clustering, the result is a plurality of clusters, where each cluster predominantly contains images of the same digit. For example, such clustering may be largely accurate, such as 85% accurate or thereabouts, but this means that images remain which are improperly clustered. However, at this stage of the algorithm, while the images are clustered, they are not labeled, and so for images representing digits, while the clusters largely group the images representing the same digit, the specific digit for each cluster has not been assigned.

Figure 2:
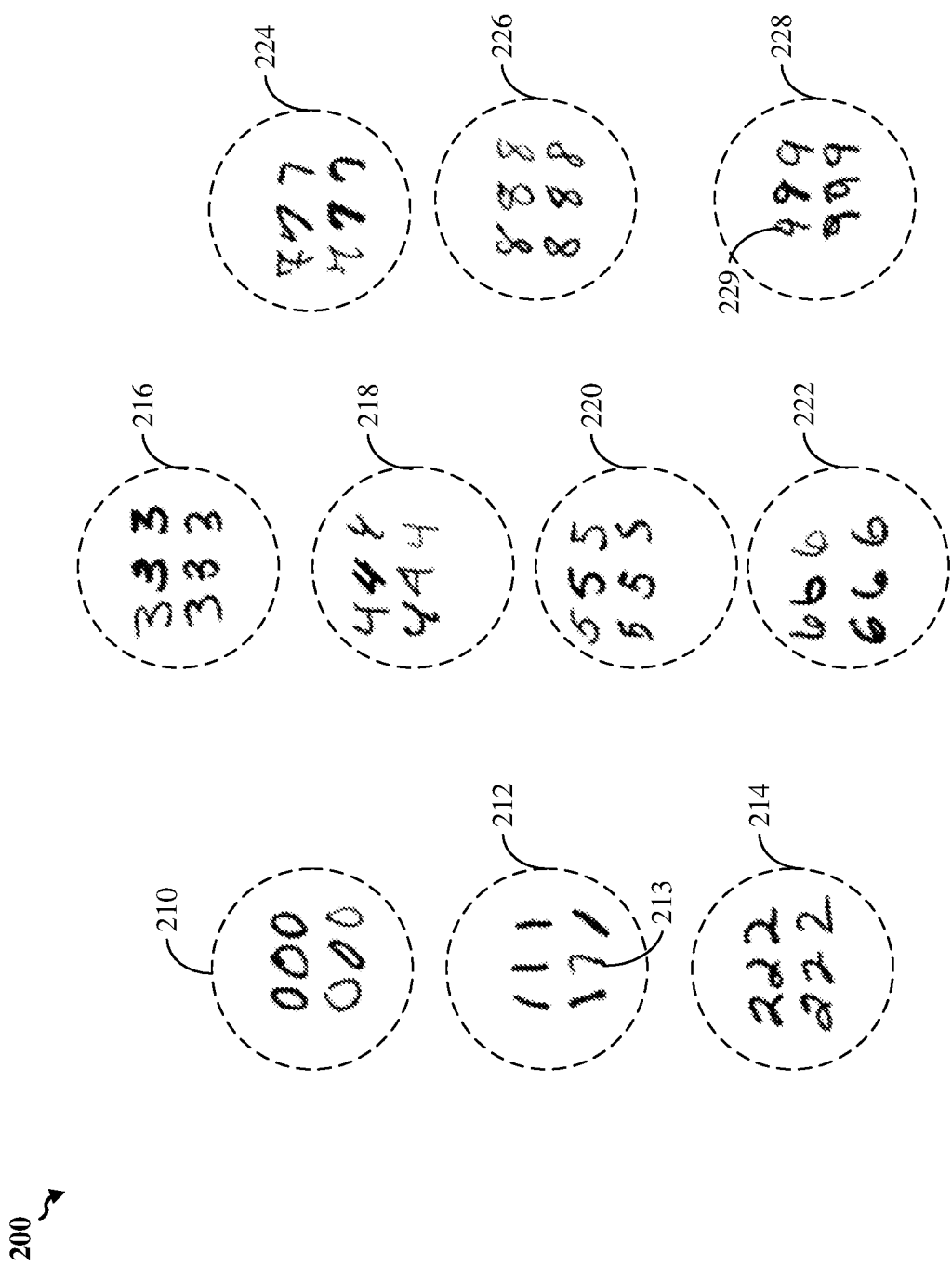
FIG. 2 shows an example plurality of clusters, in accordance with some example implementations.

FIG. 2 shows an example plurality of clusters 200, in accordance with some example implementations. More particularly, the plurality of clusters 200 include clusters of handwritten digits such that images of the same digit are intended to be in the same cluster. Thus, for example, cluster 210 includes zeroes, cluster 212 includes 1s, and so on. However, as mentioned above, this clustering is not 100% accurate, and so some images are assigned to the wrong cluster in FIG. 2. For example, in cluster 212 which includes images of ones there is an image 213 of a seven which should be in cluster 224. Similarly, in cluster 228 there is an image 229 of a four which should be in cluster 218. Note that the clusters of FIG. 2 each include six images, but that in other implementations the clusters may have any suitable size. Similarly, while each cluster of FIG. 2 includes the same number of images, that in other implementations each cluster may contain differing numbers of images. Note that while FIG. 2 shows ten clusters of images, that in some implementations there may be other number of clusters of images. For example, as discussed above, the images may include arithmetic operators or grouping operators, and there may be a cluster for each such arithmetic or grouping operator.

Labels may then be assigned to each cluster. The constraints on each set of images may be used to determine these labels. For example, when the constraint is a sum constraint for a set of images having a width w and a height h, this sum may be represented as $$\sum_{k=1}^{h} \sum_{j=1}^{w} \text{label}(\text{image}_{i,j}) * 10^{w-j} = \text{sum}.$$

If the clustering were 100% accurate, then such a system of linear equations could be solved to identify the label for each cluster. However, as discussed above, clustering is not 100% accurate. Instead, in some aspects, the label for each cluster may be determined by identifying the cluster labeling which satisfies more constraints among the plurality of sets of images than any other prospective label assignment. In some aspects the error for each prospective label assignment may be determined based on a sum of absolute differences between the intended value of the constraint and the sum based on the prospective label assignment. For example, consider the example of FIG. 1C, where the sum is 93. If all of the images in FIG. 1C were correctly labeled, the error would be zero. If the labels for the clusters representing one and seven were switched, the error would be 60, as the twelve in the second row would instead be 72. The errors may be summed for each set of images for each prospective label assignment and the prospective label assignment having the minimum total error may be selected for labeling the clusters.

In some aspects, the labels may be formulated as an integer linear problem. The sets of images may be split into batches of a predetermined size, such as batches each including 100 sets of images. A solver may run for each batch, using a suitable optimization technique, such as a convex optimization technique which may use a modeling language such as CVXPY, where the L1 norm is used as the accuracy metric (or objective function). In some aspects, a label assignment may be determined for each batch, and then the overall label assignment may be the prospective label assignment associated with the greatest accuracy metric among the plurality of batches.

After each cluster has been labeled, images within the clusters may still be labeled incorrectly. Indeed, any errors due to images being assigned to the wrong cluster may remain after labeling regardless of how the clusters are labeled. The example implementations may use knowledge of the constraints and the clustering characteristics to iteratively improve the label accuracy by identifying incorrectly clustered images and moving them to the correct cluster. The example implementations use the constraints and the clustering to seed a set of correctly clustered images with images most likely to be correctly clustered, and then iterate outward from such seeds, using the constraints to identify and correct misclustered images. More particularly, this iterative process may begin with an empty set of correctly clustered images. For each iteration in the process images within a radius r of the centroid of each cluster may be added to the set of correctly clustered images. For example, when the clustering is performed using k-means, the centroid for each cluster may refer to the data point that represents the center of each cluster. For example, r may be set to an initial value for a first iteration of the process, such as r=1, and then incremented for each additional iteration. In some aspects, the process may be repeated from r=1 to r=5, or another suitable final radius.

After adding the images within radius r of the centroids to the set of correctly clustered images, new correctly labeled images may be inferred using the constraints. For example, where the constraints are sums associated with each set of images, and at least a specified portion of the images in a set of images are in the set of correctly clustered images, the sum may be used to determine whether or not remaining images of the set of images are correctly clustered. As a simple example, consider FIG. 1A, where the first image in the set (depicting the digit 3) is in the set of correctly clustered images, and the second image is not. Knowing that the sum of the two images' labels is 5 and that the first image label is 3, the second image label may be inferred as 2. If the second image is already in the cluster labeled 2, then the second image may be added to the set of correctly clustered images. However, if the second label is in a different cluster, than the iterative process may correct the clustering by moving this image to the cluster labeled as 2. Thus, if all but one of the images in a set of images are in the set of correctly clustered images, the correct label for the remaining image may be inferred, and the image moved to the correct cluster if needed.

In some aspects, not every image in a set of images needs to be in the set of correctly clustered images for image labels to be inferred. Consider the set of images depicted in FIG. 1C. If all but one of the images in the right column of arithmetic problem 120C (the "ones column") are in the set of correctly clustered images, the correct cluster label for the remaining image in that column may be inferred. For example, if the top two images in the right column of the arithmetic problem 120C are in the set of correctly clustered images (depicting the digits 6 and 2), then the sum 93 may be used to determine that the bottom image must have the label of 5 in order for the sum to have a value of 3 in its ones column. That is, 6+2+A=X3, where A is the label for the third image, and X is the tens digit of the sum. This equation indicates that A must be 5, and so the correct cluster for the third image in the right column may be inferred. More generally, if all but one of the images are in the set of correctly clustered images for any number of least significant columns of the arithmetic problem represented by a set of images, then the remaining image's correct cluster may be inferred. As an example, consider the arithmetic problem 120B of FIG. 1B. If both images in the ones column are known, but only the top image in the tens column is known, then the correct label for the bottom image in the tens column may be inferred based on the sum. In other words, if we know that 25+X3=98, where X is the digit in the tens column of the second addend, then we know that X is 7 and can either verify that the image is correctly clustered or move this image to the cluster labeled 7.

This process may be continued until all possible image labels are inferred for the initial value of r. Then r may be incremented, and the process repeated, adding images within the incremented r of the cluster centroids to the set of correctly clustered images, and inferring additional image labels based on the additional correctly clustered images.

After the iterative process has completed, and incorrectly clustered images moved to their correct clusters, the updated clusters may be used to train a machine learning model to classify new images. For example, the machine learning model may be a convolutional neural network, or another suitable machine learning model.

Figure 3:
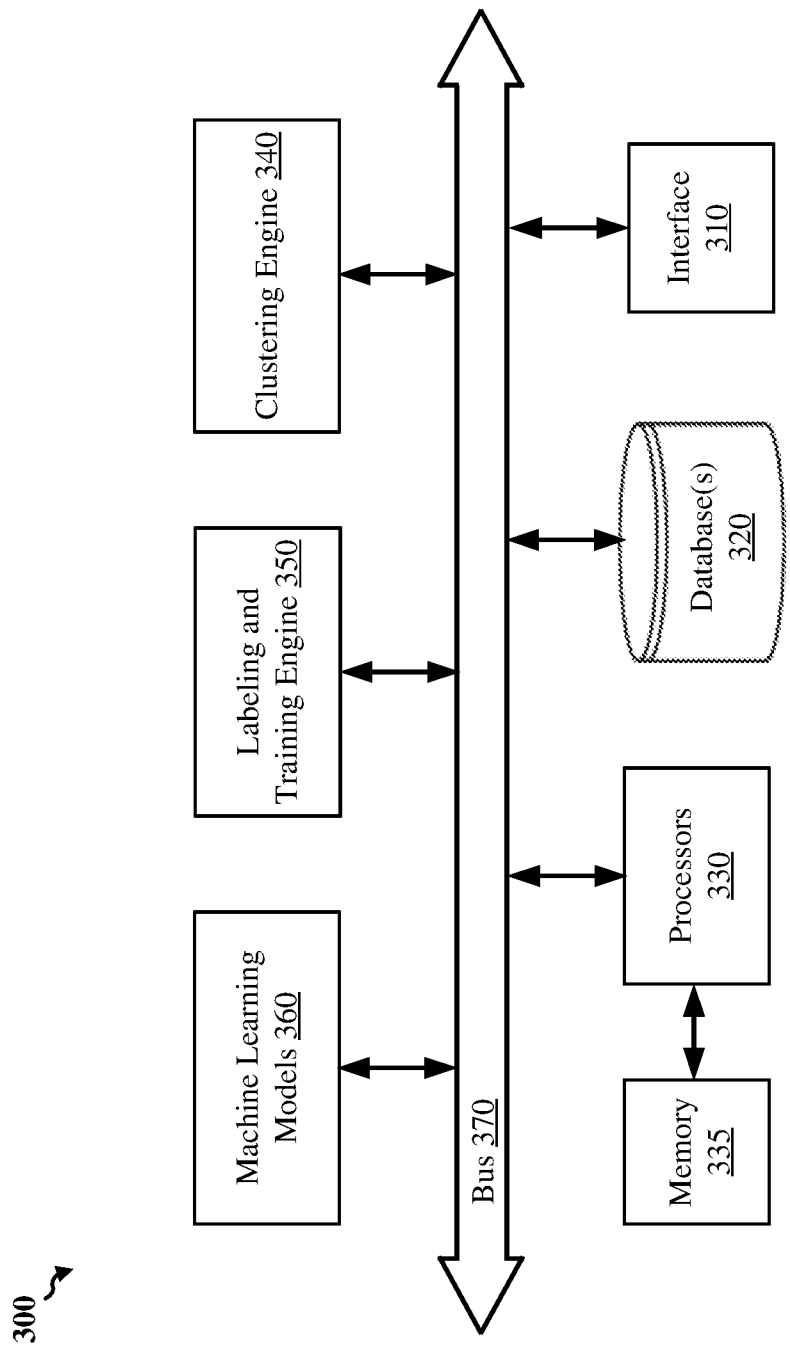
FIG. 3 shows a machine learning training system, according to some implementations.

FIG. 3 shows a machine learning training system 300, according to some implementations. The machine learning training system 300 is shown to include an input/output (I/O) interface 310, a database 320, one or more data processors 330, a memory 335 coupled to the data processors 330, a clustering engine 340, a labeling and training engine 350, and one or more machine learning models 360. In some implementations, the various components of the machine learning training system 300 may be interconnected by at least a data bus 370, as depicted in the example of FIG. 3. In other implementations, the various components of the machine learning training system 300 may be interconnected using other suitable signal routing resources.

The interface 310 may include a screen, an input device, and other suitable elements that allow a user to provide information to the machine learning training system 300 and/or to retrieve information from the machine learning training system 300. Example information that can be provided to the machine learning training system 300 may include configuration information for the machine learning training system 300, training data for the machine learning models 360, such as including a plurality of sets of images, such as a plurality of sets of images of handwritten characters or symbols each set including an associated value of a constraint, and so on. Example information that can be retrieved from the machine learning training system 300 may include data representing a machine learning model trained by the machine learning training system 300, prediction data generated by the machine learning training system 300, such as predicted labels for subsequently received images, and the like.

The database 320, which may represent any suitable number of databases, may store any suitable information pertaining to training and input data for the machine learning models 360, configuration information for the machine learning training system 300, one or more rules or algorithms for training the machine learning models 360, or the like. In some implementations, the database 320 may be a relational database capable of presenting the information as data sets to a user in tabular form and capable of manipulating the data sets using relational operators. In some aspects, the database 320 may use Structured Query Language (SQL) for querying and maintaining the database 320.

The data processors 330, which may be used for general data processing operations (such as manipulating the data sets stored in the database 320), may be one or more suitable processors capable of executing scripts or instructions of one or more software programs stored in the machine learning training system 300 (such as within the memory 335). The data processors 330 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 330 may be implemented as a combination of computing devices (such as a combination of a DSP and a microprocessor, a plurality of microprocessors, one or more microprocessors in conjunction with a DSP core, or any other such configuration).

The memory 335, which may be any suitable persistent memory (such as non-volatile memory or non-transitory memory) may store any number of software programs, executable instructions, machine code, algorithms, and the like that can be executed by the data processors 330 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The clustering engine 340 may cluster images into a predetermined number of clusters. More particularly, the clustering engine 340 may be configured to cluster the images into the predetermined number of clusters, where each cluster represents a different text character or symbol. In some aspects, the clustering engine 340 may receive images from a plurality of sets of images, where each image is an image of a digit, and may cluster the images into 10 clusters, each cluster representing a different digit. The clustering engine 340 may include one or more machine learning models configured to perform this clustering. In some aspects, the clustering engine 340 may include one or more autoencoders, such as one or more fully symmetric autoencoders, which may have dense layer dimensions of [500, 500, 2000, 10], and may be trained for roughly 300 epochs. In some implementations, the clusters may be generated based on the weights of such an autoencoder, such as using k-means, which may include a k-means++initialization.

The labeling and training engine 350 may assign a label to each cluster of the plurality of clusters generated by the clustering engine 340. As discussed above, these cluster labels may be assigned using the constraints associated with each set of images. Further, the labeling and training engine 350 may identify incorrectly labeled images using these constraints, for example using the iterative process described above. Incorrectly labeled images may be reassigned to their proper cluster. The labeling and training engine 350 may then train one or more of the machine learning models 360 using the final image labels after the incorrectly labeled images have been reassigned to their proper clusters.

The machine learning models 360 may include any number of machine learning models that can be used to predict labels for images of characters or symbols based on associated constraint values. A machine learning model can take the form of an extensible data structure that can be used to represent sets of words or phrases and/or can be used to represent sets of attributes or features. In some implementations, the machine learning models 360 may include deep neural networks (DNNs), such as convolutional neural networks, which may have any suitable architecture, such as a feedforward architecture or a recurrent architecture. In addition or in the alternative, the machine learning models may be based on algorithms such as logistic regression, decision trees, random forest regressors, ensembles of decision trees, and so on. The machine learning models 360 may be trained using training data generated by the labeling and training engine 350.

The particular architecture of the machine learning training system 300 shown in FIG. 3 is but one example of a variety of different architectures within which aspects of the present disclosure may be implemented. For example, in other implementations, the machine learning training system 300 may not include clustering engine 340, the functions of which may be implemented by the processors 330 executing corresponding instructions or scripts stored in the memory 335. In some other implementations, the functions of the labeling and training engine 350 may be performed by the processors 330 executing corresponding instructions or scripts stored in the memory 335. Similarly, the functions of the machine learning models 360 may be performed by the processors 330 executing corresponding instructions or scripts stored in the memory 335.

Figure 4:
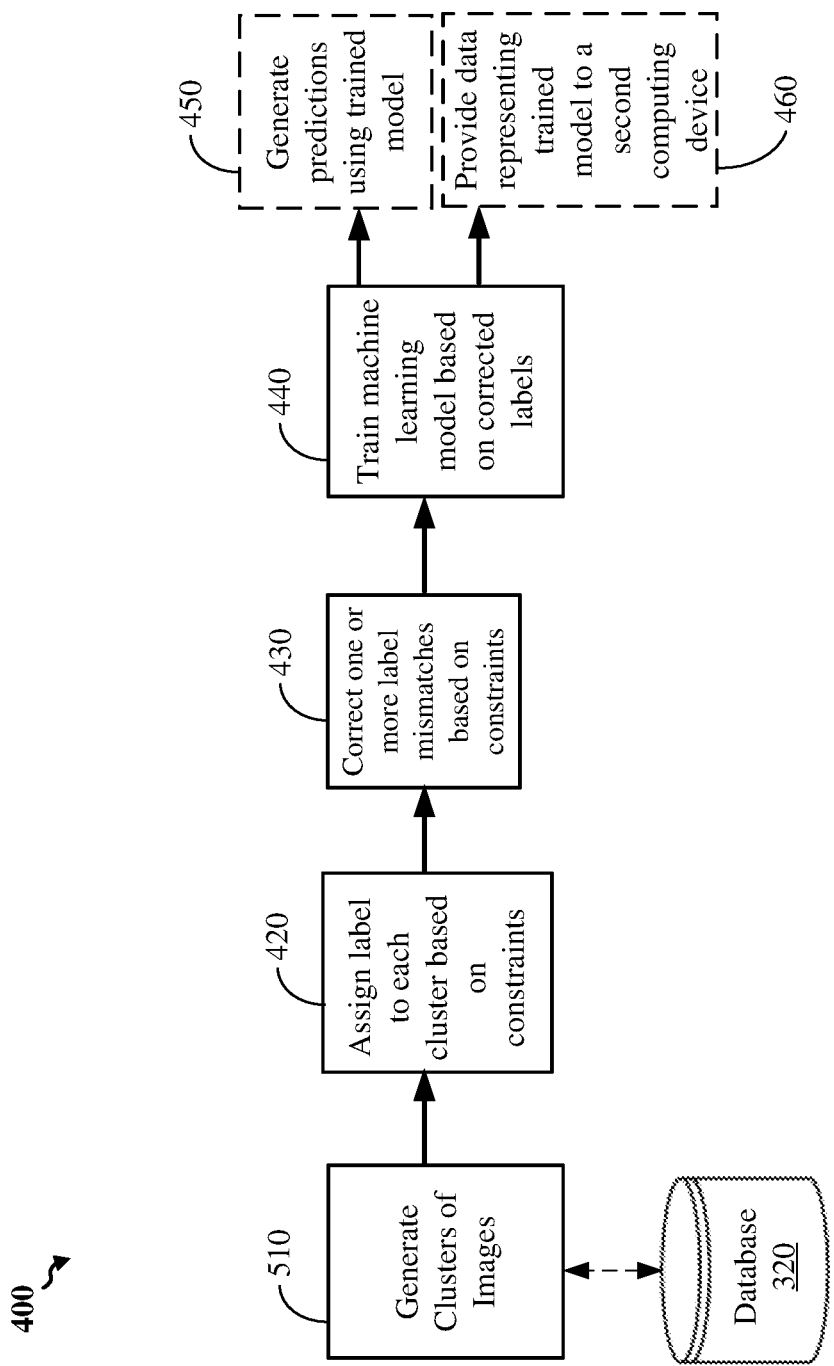
FIG. 4 shows a high-level overview of an example process flow that may be employed by the machine learning training system of FIG. 3.

FIG. 4 shows a high-level overview of an example process flow 400 that may be employed by the machine learning training system 300 of FIG. 3. In block 410, the machine learning training system 300 generates a plurality of clusters of images based on a plurality of sets of images. The plurality of clusters may include a predetermined number of clusters, such as ten clusters. For example, the plurality of sets of images may be received via one or more network interfaces coupled to the machine learning training system 300 or retrieved from the database 320 or another memory coupled to the machine learning training system 300. Each set of images may be associated with a constraint. In block 420, the machine learning training system 300 may assign a label to each cluster. For example, the labels may be assigned based at least in part on the values of the constraints assigned to each set of images of the plurality of sets of images. In block 430, the machine learning training system 300 may correct one or more label mismatches based on the constraints. For example, these corrections may be performed using the iterative process described above. In block 440, the machine learning training system 300 may train the machine learning model 360 using the corrected image labels. For example, the training may train the machine learning model to predict text characters or symbols associated with subsequently received images based on associated constraints. Optionally, in block 450, the trained machine learning model 360 may predict text characters or symbols associated with the subsequently received images. In block 460, the machine learning training system 300 may optionally provide data representing the trained machine learning model to a second computing device. For example, after training the machine learning model 360, data representing the trained machine learning model may be sent to the second computing device so that the second computing device may generate the predictions by executing the data representing the trained machine learning model.

Figure 5:
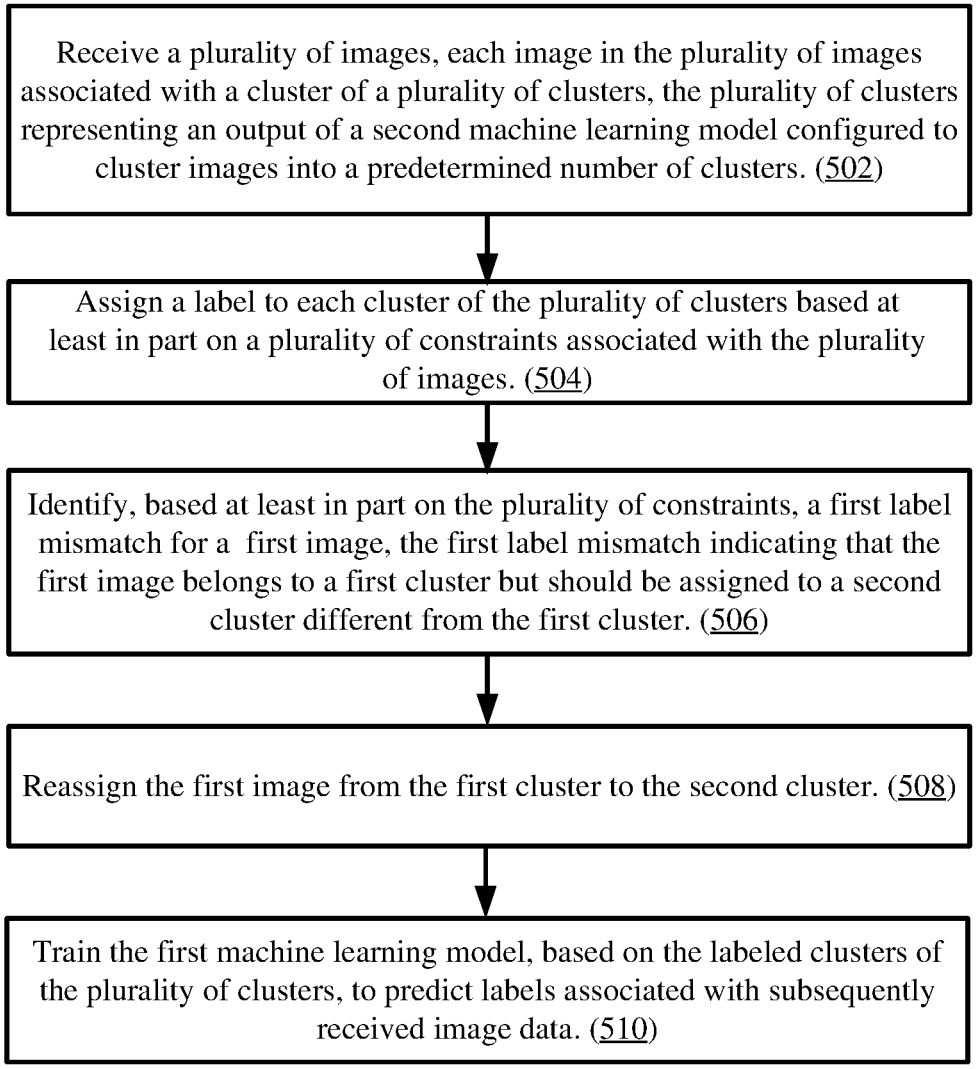
FIG. 5 shows an illustrative flow chart depicting an example operation for training a first machine learning model to cluster and label images, according to some implementations.

FIG. 5 shows an illustrative flow chart depicting an example operation 500 for training a first machine learning model to cluster and label images, according to some implementations. The example operation 500 may be performed by one or more processors of a computing device, and in some implementations, the example operation 500 may be performed using the machine learning training system 300 of FIG. 3. It is to be understood that the example operation 600 may be performed by any suitable systems, computers, or servers.

At block 502, the machine learning training system 300 receives a plurality of images, each image in the plurality of images associated with a cluster of a plurality of clusters, the plurality of clusters representing an output of a second machine learning model configured to cluster images into a predetermined number of clusters. At block 504, the machine learning training system 300 assigns a label to each cluster of the plurality of clusters based at least in part on a plurality of constraints associated with the plurality of images. At block 506, the machine learning training system 300 identifies, based at least in part on the plurality of constraints, a first label mismatch for a first image, the first label mismatch indicating that the first image belongs to a first cluster but should be assigned to a second cluster different from the first cluster. At block 508, the machine learning training system 300 reassigns the first image from the first cluster to the second cluster. At block 510, the machine learning training system 300 trains the first machine learning model, based on the labeled clusters of the plurality of clusters, to predict labels associated with subsequently received image data.

In some aspects, receiving the plurality of images in block 502 further includes receiving a plurality of sets of images, where each set of images includes an ordered plurality of images representing an ordered plurality of digits, wherein each constraint of the plurality of constraints represents a sum associated with a respective set of images, and using the second trained machine learning model, assigning each image of the plurality of sets of images to a respective cluster of the plurality of clusters.

In some aspects, the predetermined number of clusters is 10, and the labels assigned to each cluster of the plurality of clusters indicate a digit between 0 and 9.

In some aspects, each set of images in the plurality of sets of images has a common width indicating a number of digits in an addend and a common height indicating a number of addends associated with each set of images, where the sum indicates a sum of addends in each respective set of images.

In some aspects, assigning the label to each cluster of the plurality of clusters in block 504 further includes determining a plurality of potential assignments of digits to the plurality of clusters, computing an accuracy metric for each prospective assignment, where the accuracy metric is based at least in part on the plurality of constraints, and selecting a most accurate prospective assignment, the most accurate prospective assigning being the prospective assignment associated with a greatest accuracy metric. In some aspects, the accuracy metric is a measure of how accurately a prospective assignment satisfies the sums associated with each set of images. In some aspects, computing the accuracy metric for each prospective assignment includes determining a plurality of batches of images, each batch of images including a predetermined number of images from the plurality of images and corresponding to a predetermined number of constraints of the plurality of constraints, for each batch of the plurality of batches, selecting a batch-specific prospective assignment associated with a greatest accuracy metric, and selecting the most accurate prospective assignment based at least in part on the selected batch-specific prospective assignments. In some aspects, the accuracy metric is based on an L1 norm indicating how closely a prospective assignment satisfies the sum associated with each set of images.

In some aspects, identifying the first label mismatch in block 506 includes identifying a centroid image for each cluster, adding the centroid image and images within a specified radius of the centroid image for each cluster to a group of resolved images, and identifying the first image based on the plurality of constraints and the group of resolved images. In some aspects, identifying the first image includes identifying a first subset of the group of resolved images corresponding to a plurality of digits in a first set of images including the first image, determining, based on a first sum associated with the first set of images and a first digit corresponding to the first cluster, that the first image does not correspond to the first digit, and identifying the second cluster as the cluster corresponding to a second digit which, together with the first subset, satisfy the sum corresponding to the first set of images. In some aspects, the operation 500 further includes iteratively increasing the specified radius and identifying, based on the plurality of constraints, one or more second label mismatches for one or more second images, each second label mismatch indicating that the one or more second images should be assigned to a different cluster. In some aspects, iteratively increasing the specified radius includes iteratively increasing the specified radius until a threshold radius is reached.

In some aspects, the second machine learning model includes a symmetric autoencoder configured to cluster the images based at least in part on a k-means clustering algorithm.

FIG. 6 shows an illustrative flow chart depicting an example operation 600 for clustering and labeling images, according to some implementations. The example operation 600 may be performed by one or more processors of a computing device, and in some implementations, the example operation 600 may be performed using the machine learning training system 300 of FIG. 3. It is to be understood that the example operation 600 may be performed by any suitable systems, computers, or servers.

At block 602, the machine learning training system 300 receives a plurality of sets of images, each set of images including an ordered plurality of images representing an ordered plurality of digits, wherein each set of images has a common width indicating a number of digits in an addend and a common height indicating a number of addends associated with each set of images in the plurality of sets of images, and each set of images is associated with a sum indicates a sum of its constituent addends. At block 604, the machine learning training system 300 uses a second trained machine learning model to assign each image in the plurality of sets of images to a respective cluster of a plurality of ten clusters. At block 606, the machine learning training system 300 assigns a digit to each cluster of the plurality of clusters based at least in part the sums associated with the sets of images, the assigned digit indicating that each image in a cluster is an image of the corresponding digit. At block 608, the machine learning training system 300 identifies, based at least in part on the sums, a first digit mismatch for a first image, the first digit mismatch indicating that the first image should be assigned to a first cluster assigned a first digit but was instead assigned to a second cluster assigned a second digit different from the first digit. At block 610, the machine learning training system 300 reassigns the first image from the second cluster to the first cluster. At block 612, the machine learning training system 300 trains the first machine learning model, based on the labeled clusters of the plurality of clusters, to predict digits associated with subsequently received image data.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of clustering and labeling images, the method performed by an electronic device coupled to a first machine learning model and comprising:
   receiving a plurality of sets of images, each set of images including an ordered plurality of images representing an ordered plurality of digits, wherein each constraint of a plurality of constraints represents a sum associated with a respective set of images;
   using a second trained machine learning model configured to cluster images into a predetermined number of clusters, assigning each image of the plurality of sets of images to a respective cluster;
   assigning a label to each cluster of the plurality of clusters based at least in part on the plurality of constraints associated with the plurality of images;
   identifying, based at least in part on the plurality of constraints, a first label mismatch for a first image, the first label mismatch indicating that the first image belongs to a first cluster but should be assigned to a second cluster different from the first cluster;
   reassigning the first image from the first cluster to the second cluster;

training the first machine learning model, based on the labeled clusters of the plurality of clusters, to predict labels associated with subsequently received image data.

2. The method of claim 1, wherein the predetermined number of clusters is 10, and the labels assigned to each cluster of the plurality of clusters indicate a digit between 0 and 9.

3. The method of claim 1, wherein each set of images in the plurality of sets of images has a common width indicating a number of digits in an addend and a common height indicating a number of addends associated with each set of images, wherein the sum indicates a sum of addends in each respective set of images.

4. The method of claim 1, wherein the label is assigned to each cluster of the plurality of clusters using an accuracy metric based at least in part on the plurality of constraints.

5. The method of claim 4, wherein assigning the label to each cluster of the plurality of clusters comprises solving a convex optimization problem based at least in part on the accuracy metric.

6. The method of claim 4, wherein computing the accuracy metric for each prospective assignment comprises:
   determining a plurality of batches of sets of images, each batch of sets of images including a predetermined number of images from the plurality of images and corresponding to a predetermined number of constraints of the plurality of constraints;
   for each batch of the plurality of batches, selecting a batch-specific prospective assignment associated with a greatest accuracy metric; and
   selecting the most accurate prospective assignment based at least in part on the selected batch-specific prospective assignments.

7. The method of claim 4, wherein the accuracy metric comprises an L1 norm indicating how closely a prospective assignment satisfies the sum associated with each set of images.

8. The method of claim 1, wherein identifying the first label mismatch comprises:
   identifying a centroid for each cluster;
   adding images within a specified radius of the centroid for each cluster to a group of resolved images; and
   identifying the first image based on the plurality of constraints and the group of resolved images.

9. The method of claim 8, wherein identifying the first image comprises:
   identifying a set of images comprising the first image and a first subset of the group of resolved images;
   determining, based on a first sum associated with the first set of images and a first digit corresponding to the first cluster, that the first image does not correspond to the first digit; and
   identifying the second cluster as the cluster corresponding to a second digit which, together with the first subset, satisfy the sum corresponding to the first set of images.

10. The method of claim 9, further comprising iteratively increasing the specified radius and identifying, based on the plurality of constraints, one or more second label mismatches for one or more second images, each second label mismatch indicating that the one or more second images should be assigned to a different cluster.

11. The method of claim 10, wherein iteratively increasing the specified radius comprises iteratively increasing the specified radius until a threshold radius is reached.

12. The method of claim 1, wherein the second machine learning model comprises a symmetric autoencoder configured to cluster the images based at least in part on a k-means clustering algorithm.

13. A system for clustering and labeling images, the system associated with a first machine learning model and comprising:
   one or more processors; and
   a memory storing instructions that, when executed by the one or more processors, cause the system to perform operations comprising:
      receiving a plurality of sets of images, each set of images including an ordered plurality of images representing an ordered plurality of digits, wherein each constraint of a plurality of constraints represents a sum associated with a respective set of images;
      using a second trained machine learning model configured to cluster images into a predetermined number of clusters, assigning each image of the plurality of sets of images to a respective cluster;
      assigning a label to each cluster of the plurality of clusters based at least in part on the plurality of constraints associated with the plurality of images;
      identifying, based at least in part on the plurality of constraints, a first label mismatch for a first image, the first label mismatch indicating that the first image belongs to a first cluster but should be assigned to a second cluster different from the first cluster;
      reassigning the first image from the first cluster to the second cluster;
      training the first machine learning model, based on the labeled clusters of the plurality of clusters, to predict labels associated with subsequently received image data.

14. The system of claim 13, execution of the instructions for assigning the label to each cluster of the plurality of clusters causes the system to perform operations further comprising:
   determining a plurality of prospective assignments of digits to the plurality of clusters;
   computing an accuracy metric for each prospective assignment, the accuracy metric based at least in part on the plurality of constraints; and
   selecting a most accurate prospective assignment, the most accurate prospective assignment being the prospective assignment associated with a greatest accuracy metric.

15. The system of claim 14, wherein execution of the instructions for computing the accuracy metric for each prospective assignment causes the system to perform operations further comprising:
   determining a plurality of batches of images, each batch of images including a predetermined number of images from the plurality of images and corresponding to a predetermined number of constraints of the plurality of constraints;
   for each batch of the plurality of batches, selecting a batch-specific prospective assignment associated with a greatest accuracy metric; and
   selecting the most accurate prospective assignment based at least in part on the selected batch-specific prospective assignments.

16. The system of claim 13, wherein execution of the instructions for identifying the first label mismatch causes the system to perform operations comprising:
   identifying a centroid image for each cluster;

adding the centroid image for each cluster and images within a specified radius of the centroid image for each cluster to a group of resolved images; and identifying the first image based on the plurality of constraints and the group of resolved images.

17. The system of claim 16, wherein execution of the instructions for identifying the first image causes the system to perform operations further comprising:

identifying a first subset of the group of resolved images corresponding to a plurality of digits in a first set of images including the first image;

determining, based on a first sum associated with the first set of images and a first digit corresponding to the first cluster, that the first image does not correspond to the first digit; and identifying the second cluster as the cluster corresponding to a second digit which, together with the first subset, satisfy the sum corresponding to the first set of images.

18. A method of clustering and labeling images, the method performed by an electronic device coupled to a first machine learning model and comprising:

receiving a plurality of sets of images, each set of images including an ordered plurality of images representing an ordered plurality of digits, wherein each set of images has a common width indicating a number of digits in an addend and a common height indicating a number of addends associated with each set of images in the plurality of sets of images, and each set of images is associated with a sum indicates a sum of its constituent addends;

using a second trained machine learning model, assigning each image in the plurality of sets of images to a respective cluster of a plurality of ten clusters;

assigning a digit to each cluster of the plurality of clusters based at least in part the sums associated with the sets of images, the assigned digit indicating that each image in a cluster is an image of the corresponding digit;

identifying, based at least in part on the sums, a first digit mismatch for a first image, the first digit mismatch indicating that the first image should be assigned to a first cluster assigned a first digit but was instead assigned to a second cluster assigned a second digit different from the first digit;

reassigning the first image from the second cluster to the first cluster; and training the first machine learning model, based on the labeled clusters of the plurality of clusters, to predict digits associated with subsequently received image data.

\* \* \* \* \*